United States Patent
Armangau et al.

(10) Patent No.: US 10,203,880 B1
(45) Date of Patent: Feb. 12, 2019

(54) SELECTIVELY OPERATING DATA STORAGE EQUIPMENT IN A "STRIPE WRITE" MODE AND A "FILL HOLE" MODE

(71) Applicant: EMC IP Holding Company LLC, Hopkinton, MA (US)

(72) Inventors: Philippe Armangau, Acton, MA (US); Bruce E. Caram, Hudson, MA (US); Christopher A. Seibel, Walpole, MA (US); Christopher Jones, North Attleboro, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 113 days.

(21) Appl. No.: 15/279,783

(22) Filed: Sep. 29, 2016

(51) Int. Cl.
*G06F 3/06* (2006.01)
(52) U.S. Cl.
CPC ......... *G06F 3/0608* (2013.01); *G06F 3/0619* (2013.01); *G06F 3/0634* (2013.01); *G06F 3/0683* (2013.01)

(58) Field of Classification Search
CPC .... G06F 3/0608; G06F 3/0619; G06F 3/0634; G06F 3/0683
See application file for complete search history.

(56) References Cited

U.S. PATENT DOCUMENTS

| | | | |
|---|---|---|---|
| 5,760,823 A | 6/1998 | Brunson et al. | |
| 7,676,514 B2 | 3/2010 | Faibish et al. | |
| 7,962,779 B2 | 6/2011 | Patel et al. | |
| 8,037,345 B1 | 10/2011 | Iyer et al. | |
| 9,606,870 B1 | 3/2017 | Meiri et al. | |
| 2002/0091903 A1* | 7/2002 | Mizuno | G06F 3/0605 711/154 |
| 2007/0180214 A1* | 8/2007 | Radhakrishnan | G06F 3/0605 711/202 |
| 2014/0379990 A1* | 12/2014 | Pan | G06F 12/0804 711/135 |
| 2015/0169450 A1* | 6/2015 | Traut | G06F 12/0862 711/142 |
| 2017/0024142 A1* | 1/2017 | Watanabe | G06F 3/06 |
| 2017/0097886 A1* | 4/2017 | Banerjee | G06F 12/0804 |
| 2017/0185338 A1* | 6/2017 | Kumar | G06F 3/0631 |

* cited by examiner

*Primary Examiner* — Mano Padmanabhan
*Assistant Examiner* — William E. Baughman
(74) *Attorney, Agent, or Firm* — Bainwood Huang (57) ABSTRACT

A technique writes data to a storage array. The technique involves operating storage circuitry in a "FILL HOLE" mode in which the circuitry writes a stream of first data portions within storage portions of used storage stripes of the array. The technique further involves, after operating the circuitry in the "FILL HOLE" mode and in response to a first event, transitioning the circuitry from the "FILL HOLE" mode to a "STRIPE WRITE" mode in which the circuitry writes a stream of second data portions within unused storage stripes of the array. The technique further involves, after operating the circuitry in the "STRIPE WRITE" mode and in response to a second event, transitioning the circuitry from the "STRIPE WRITE" mode back to the "FILL HOLE" mode in which the circuitry writes a stream of third data portions within storage portions of used storage stripes of the array.

22 Claims, 6 Drawing Sheets

SELECTIVELY OPERATING DATA STORAGE EQUIPMENT IN A "STRIPE WRITE" MODE AND A "FILL HOLE" MODE

BACKGROUND

Some conventional data storage systems routinely buffer data in write caches before flushing the data out as stripes to data storage arrays. That is, when such a data storage system has enough data segments in its write cache to perform a full stripe write operation (e.g., four 64 KB data segments for 256 KB of total data), the data storage system computes a parity segment and then writes the data segments and the parity segment as a full stripe to the storage devices of the array (e.g., RAID Level 5 (4+1)).

It should be understood that some of the data that is written by a full stripe write operation may be an update of existing data. In such a situation, the data storage system updates metadata for the data so that the metadata now indicates that the data is located in the newly written stripe.

SUMMARY

Unfortunately, there are deficiencies to the above-described conventional data storage system that routinely buffers data in write caches before flushing the data out as stripes to data storage arrays. For example, the above-described conventional data storage system that constantly performs full stripe write operations heavily consumes unused storage stripes within the array. Accordingly, the data storage system is burdened with having to spend a large amount of resources to defragment existing stripes within the array to form enough new unused storage stripes to keep up with the constant demand for full stripe write operations.

Additionally, some arrays may store data in flash memory. Unfortunately, the heavy consumption of unused storage stripes by the above-described conventional data storage system causes excessive wear of the flash memory thus reducing flash memory lifetime.

Furthermore, when the data stripes include updates to existing data, the metadata for the data must be updated as well. Such updating of the metadata consumes resources (e.g., processor cycles, memory locks, bus contention, etc.) and causes further flash wear in data storage systems that use flash memory.

In contrast to the above-described conventional data storage system that constantly performs full stripe write operations to write data to an array, improved techniques are directed to selectively operating data storage equipment in a "STRIPE WRITE" mode and a "FILL HOLE" mode. In the "STRIPE WRITE" mode, the data storage equipment buffers data into data stripes and then writes the data stripes into unused storage stripes of an array of storage devices thus efficiently generating parity directly from the buffered data without unnecessarily creating extra input/output (I/O) operations to read parity from the array. In the "FILL HOLE" mode, the data storage system writes the data into used storage stripes of the array thus reducing consumption of unused storage stripes and thus imposing less demand on other supporting services such as defragmentation that has to create more unused storage stripes. Selection of the particular mode may be based on loading measurements (e.g., aging of data within a cache, cache consumption, I/O operations per second, and so on).

One embodiment is directed to a method of writing data to an array of storage devices that is coupled to data storage equipment. The method includes operating the data storage equipment in a "FILL HOLE" mode in which the data storage equipment receives a stream of first data portions and writes the stream of first data portions within storage portions of used storage stripes of the array of storage devices. The method further includes, after operating the data storage equipment in the "FILL HOLE" mode and in response to a first event, transitioning the data storage equipment from the "FILL HOLE" mode to a "STRIPE WRITE" mode in which the data storage equipment receives a stream of second data portions and writes the stream of second data portions within unused storage stripes of the array of storage devices. The method further includes, after operating the data storage equipment in the "STRIPE WRITE" mode and in response to a second event, transitioning the data storage equipment from the "STRIPE WRITE" mode back to the "FILL HOLE" mode in which the data storage equipment receives a stream of third data portions and writes the stream of third data portions within storage portions of used storage stripes of the array of storage devices.

In some arrangements, the method further includes, after transitioning the data storage equipment from the "FILL HOLE" mode to the mode "STRIPE WRITE" mode and before transitioning the data storage equipment from the "STRIPE WRITE" mode back to the "FILL HOLE" mode, operating the data storage equipment in the "STRIPE WRITE" mode in which the stream of second data portions is written as full data stripes within unused storage stripes of the array of storage devices. Accordingly, the data storage equipment is able to freely switch between "STRIPE WRITE" mode and "FILL HOLE" mode.

In some arrangements, operating the data storage equipment in the "FILL HOLE" mode includes:
 (i) reading existing parity from a used storage stripe of the array of storage devices,
 (ii) generating new parity based on a set of first data portions and the existing parity, and
 (iii) writing the set of first data portions and the new parity into the used storage stripe of the array of storage devices.

In these arrangements, the existing parity is overwritten by the new parity.

In some arrangements, operating the data storage equipment in the "STRIPE WRITE" mode includes:
 (i) accumulating multiple second data portions from the stream of second data portions,
 (ii) generating a parity portion based on the multiple second data portions, and
 (iii) writing a full data stripe into an unused storage stripe of the array of storage devices.

In these arrangements, the full data stripe includes the multiple second data portions and the parity portion.

In some arrangements, a second data portion of the full data stripe is a new data portion that replaces an existing data portion that is stored in a used storage stripe of the array of storage devices. In these arrangements, the method further includes updating metadata, which identifies the second data portion, to no longer address a particular storage portion of the used storage stripe and to now address a particular storage portion of the unused storage stripe that is written to with the full data stripe.

In some arrangements, the method further includes electronically collecting load measurements. Each load measurement identifies an amount of loading on the data storage equipment. In these arrangements, the method further includes providing event notifications based on the electronically collected load measurements, the event notifications identifying the first event and second event.

In some arrangements, providing the event notifications based on the electronically collected load measurements includes outputting a first event notification identifying the first event. The first event notification indicates that write loading on the data storage equipment has increased from a normal level to a critical level.

In some arrangements, electronically collecting the load measurements includes detecting that an age of a set of first data portions within a cache exceeds a predefine age threshold. The cache operates as a buffer for data en route to the array of storage devices. In these arrangements, outputting the first event notification includes providing an alert indicating that the age of the set first data portions within the cache exceeds the predefine age threshold, the data storage equipment transitioning from the "FILL HOLE" mode to the "STRIPE WRITE" mode in response to the alert.

In some arrangements, electronically collecting the load measurements includes detecting that presence of a set of first data portions within a cache causes a cache consumption percentage of the cache to exceed a predefine cache consumption threshold. The cache operates as a buffer for data en route to the array of storage devices. In these arrangements, outputting the first event notification includes providing an alert indicating that the cache consumption percentage exceeds the predefine cache consumption threshold. The data storage equipment transitions from the "FILL HOLE" mode to the "STRIPE WRITE" mode in response to the alert.

In some arrangements, providing the event notifications based on the electronically collected load measurements further includes outputting a second event notification identifying the second event. In these arrangements, the second event notification indicates that write loading on the data storage equipment has decreased from the critical level to the normal level.

In some arrangements, providing the event notifications based on the electronically collected load measurements further includes outputting a second event notification identifying the second event. In these arrangements, the second event notification indicates that a "STRIPE WRITE" mode timer has elapsed, the "STRIPE WRITE" mode timer having been initially set to a predefined amount of time in response to the first event notification.

In some arrangements, the data storage equipment manages multiple logical units of storage (LUNs). In these arrangements, the method further includes directing the data storage equipment to independently operate in the "FILL HOLE" mode and the "STRIPE WRITE" mode in a per LUN manner for each LUN of the multiple LUNs managed by the data storage equipment. That is, the data storage equipment operates between the "FILL HOLE" mode and the "STRIPE WRITE" mode for a first LUN, and independently operates between the "FILL HOLE" mode and the "STRIPE WRITE" mode for a second LUN that is different than the first LUN, and so on.

Another embodiment is directed to data storage equipment which includes a communications interface, memory, and control circuitry coupled to the communications interface and the memory. The memory stores instructions which, when carried out by the control circuitry, causes the control circuitry to:

(A) operate the data storage equipment in a "FILL HOLE" mode in which the data storage equipment receives a stream of first data portions and writes the stream of first data portions within storage portions of used storage stripes of an array of storage devices through the communications interface, (B) after operating the data storage equipment in the "FILL HOLE" mode and in response to a first event, transition the data storage equipment from the "FILL HOLE" mode to a "STRIPE WRITE" mode in which the data storage equipment receives a stream of second data portions and writes the stream of second data portions within unused storage stripes of the array of storage devices through the communications interface, and (C) after operating the data storage equipment in the "STRIPE WRITE" mode and in response to a second event, transition the data storage equipment from the "STRIPE WRITE" mode back to the "FILL HOLE" mode in which the data storage equipment receives a stream of third data portions and writes the stream of third data portions within storage portions of used storage stripes of the array of storage devices through the communications interface.

Yet another embodiment is directed to a computer program product having a non-transitory computer readable medium which stores a set of instructions to write data to an array of storage devices. The set of instructions, when carried out by data storage equipment, causes the data storage equipment to perform a method of:

(A) operating the data storage equipment in a "FILL HOLE" mode in which the data storage equipment receives a stream of first data portions and writes the stream of first data portions within storage portions of used storage stripes of the array of storage devices;

(B) after operating the data storage equipment in the "FILL HOLE" mode and in response to a first event, transitioning the data storage equipment from the "FILL HOLE" mode to a "STRIPE WRITE" mode in which the data storage equipment receives a stream of second data portions and writes the stream of second data portions within unused storage stripes of the array of storage devices; and (C) after operating the data storage equipment in the "STRIPE WRITE" mode and in response to a second event, transitioning the data storage equipment from the "STRIPE WRITE" mode back to the "FILL HOLE" mode in which the data storage equipment receives a stream of third data portions and writes the stream of third data portions within storage portions of used storage stripes of the array of storage devices.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in selectively operating data storage equipment in a "STRIPE WRITE" mode and a "FILL HOLE" mode.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to selectively operating data storage equipment in a "STRIPE WRITE" mode and a "FILL HOLE" mode. In the "STRIPE WRITE" mode, the data storage equipment buffers data into data stripes and then writes the data stripes into unused storage stripes of an array of storage devices thus efficiently generating parity directly from the buffered data without unnecessarily creating extra input/output (I/O) operations that read existing parity from existing data stripes that are stored in the array in order to overwrite data in place. In the "FILL HOLE" mode, the data storage system writes the data into used storage stripes of the array thus reducing consumption of unused storage stripes and thus imposing less demand on other supporting services such as defragmentation that creates more unused storage stripes. Selection of the particular mode may be based on loading measurements (e.g., aging of write data within the cache, percentage of cache consumption, write operations per second, and so on).

Figure 1:
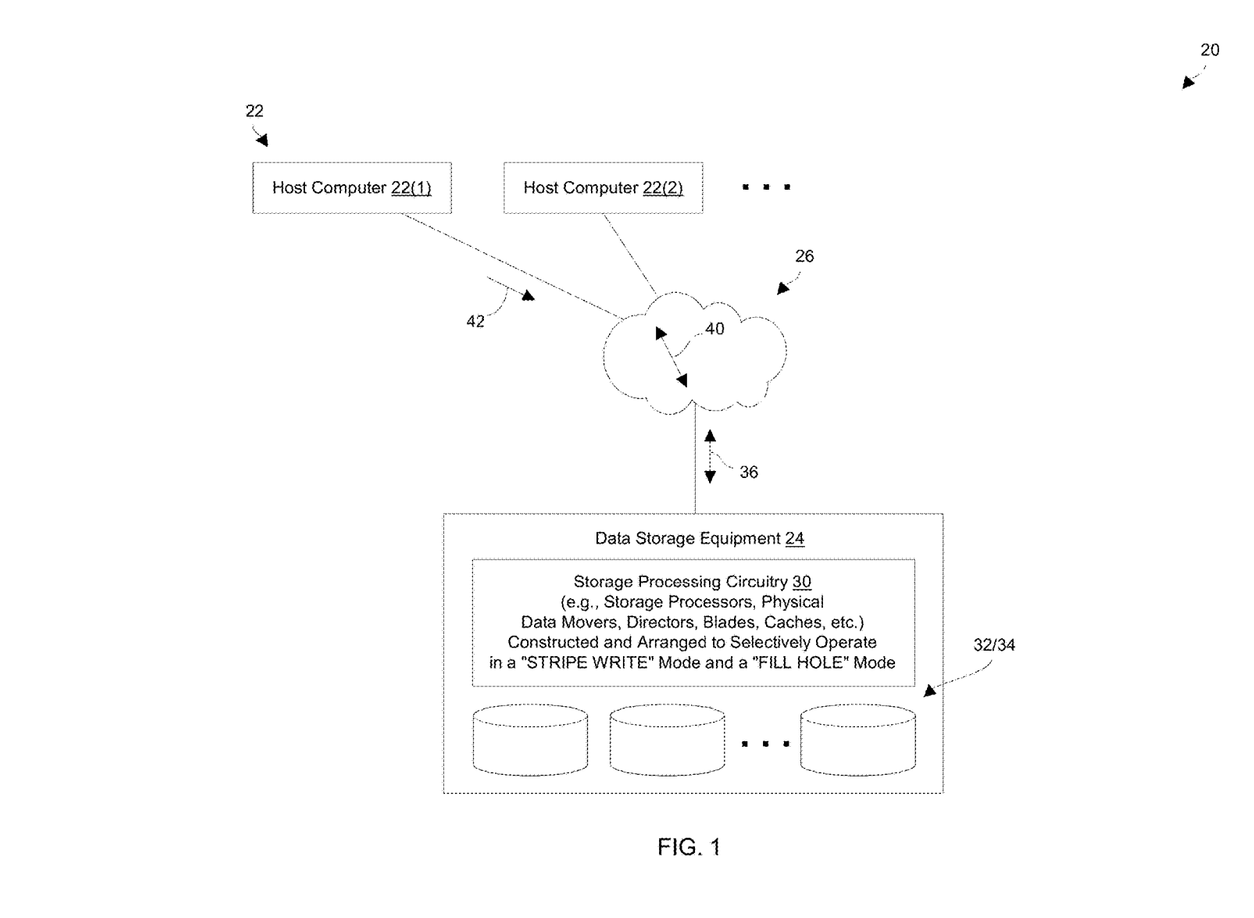
FIG. 1 is a block diagram of a data storage environment which is suitable for selectively operating data storage equipment in a "STRIPE WRITE" mode and a "FILL HOLE" mode.

FIG. 1 shows a data storage environment 20 which is suitable for selectively operating data storage equipment in a "STRIPE WRITE" mode and a "FILL HOLE" mode. The data storage environment 20 includes host computers 22(1), 22(2), . . . (collectively, host computers 22), data storage equipment 24, and a communications medium 26.

Each host computer 22 is constructed and arranged to access host data that is maintained by the data storage system 24. Along these lines, the host computers 22 may operate as independent devices, as one or more clusters, or combinations thereof to perform useful work (e.g., to access databases, as webservers, as content servers, as email servers, combinations thereof, etc.).

The data storage system 24 is constructed and arranged to store host data on behalf of the host computers 22. The host data may reside in files of file systems, as block-based data within logical units of storage (LUNs) or volumes, volumes within files, file systems within volumes, combinations thereof, and so on. The particular storage techniques that are put in use (e.g., file-based, block-based, etc.) may be application dependent and can be configured by the operator of the data storage system 24.

The data storage system 24 includes storage processing circuitry 30 and an array 32 of storage devices 34. The storage processing circuitry 30 is constructed and arranged to selectively operate in a "STRIPE WRITE" mode and a "FILL HOLE" mode. Further details of such operation will be provided below. The array 32 of storage devices 34 is constructed and arranged to robustly and reliably store data 36. In some arrangements, the data 36 resides within the array 32 of storage devices 34 in accordance with a particular RAID (Redundant Array of Independent Disks) Level that uses parity such as RAID Level 5, RAID Level 6, etc. In a particular arrangement, the data 36 resides within the array 32 of storage devices 34 via RAID Level 5 (4+1).

The communications medium (or fabric) 26 is constructed and arranged to connect the various components of the data storage environment 20 together to enable these components to exchange electronic signals 40 (e.g., see the double arrow 40). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, cellular communications, WAN-based communications, distributed infrastructure communications, other topologies, combinations thereof, etc.

During operation, the host computers 22 send host I/O requests 42 (e.g., file access commands, SCSI commands, etc.) to the data storage system 24 through the communications medium 26. Such host I/O requests 42 may write data 36 to the data storage equipment 24 and read data 36 from the data storage equipment 24.

Based on particular criteria, the storage processing circuitry 30 selects a particular operating mode by which to write the data 36 to the array 32. Along these lines, the storage processing circuitry 30 writes the data 36 to the array 32 in a "FILL HOLE" mode when particular write loading on the storage processing circuitry 30 is relatively light (i.e., periods of relatively low demand to perform write operations). While in the "FILL HOLE" mode, the storage processing circuitry 30 writes data 36 within storage portions of used storage stripes of the array 32. In particular, existing data 36 is overwritten with updated data 36. Additionally, new data is written into available holes (e.g., unused blocks) within used storage stripes. To this end, the storage processing circuitry 30 reads existing parity from the used storage stripes and calculates new parity before writing the data 36 and the new parity to the used storage stripes.

One should appreciate that it is acceptable to operate in this "FILL HOLE" mode during periods of light write loading since the data storage equipment 24 is not struggling to maintain performance. Rather, resources such as cache space, bus availability, etc. are available thus providing latency which is within acceptable limits.

On the other hand, the storage processing circuitry 30 may transition to a "STRIPE WRITE" mode when writing loading becomes heavier (i.e., periods of higher demand to perform write operations). While in the "STRIPE WRITE" mode, the storage processing circuitry 30 writes data 36 as full data stripes within unused storage stripes of the array 32. Here, there storage processing circuitry 30 generates new parity segments directly from data segments that are ready to be written to the unused storage stripes without having to read parity from existing storage stripes thus minimizing latency. Furthermore, the storage processing circuitry 30 updates metadata to enable the storage processing circuitry 30 to properly locate the data 36 within the array 32.

One should appreciate that it is extremely efficient to operate in this "STRIPE WRITE" mode during periods of heavy write loading since such operation enables the cached data 36 to be flushed relatively quickly without lingering within the cache very long. Additionally, the percentage of the cache that is consumed by the data 36 is appropriately managed (e.g., kept low) by the speed of the full stripe write operations (e.g., there is no waiting to read existing parity from the array 32).

It should be understood that the storage processing circuitry 30 is able to control which write mode is used based on electronically collecting load measurements to monitor write loading. When the storage processing circuitry 30 determines that a particular write loading criteria is reached (e.g., by comparing the age of the data 36 in the cache to a predefined threshold, by comparing the percentage of cache consumption to a predefined threshold, etc.), the storage processing circuitry 30 may output an event notification which triggers transition from one write mode to another. The storage processing circuitry 30 may then stay in that write mode for a predefined amount of time and then revert back to the original write mode under certain conditions. Further details will now be provided with reference to FIG. 2.

Figure 2:
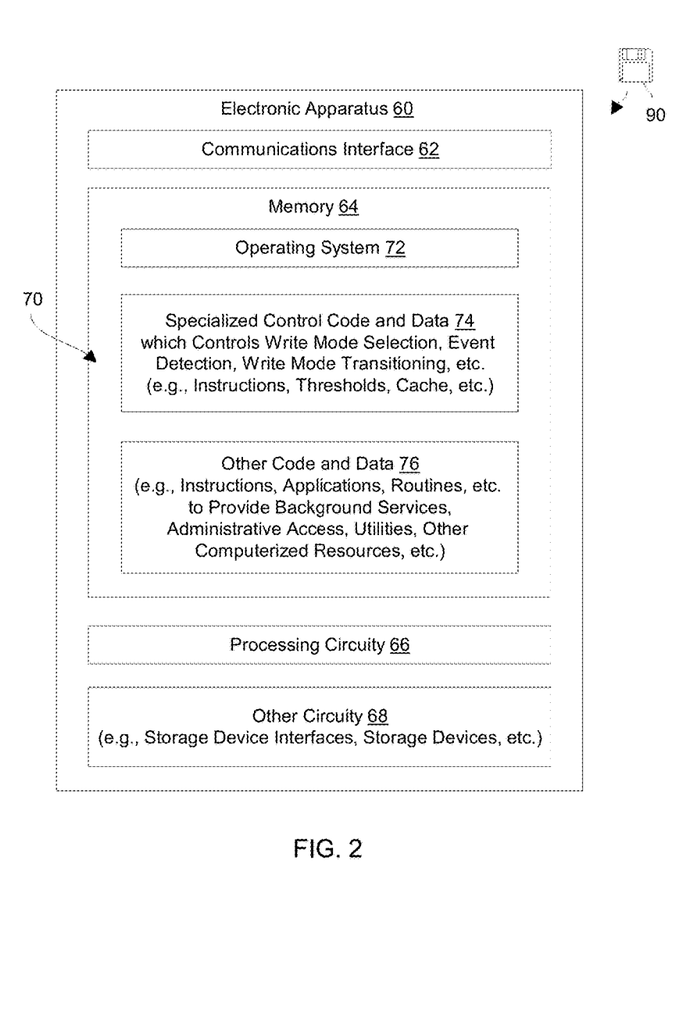
FIG. 2 is a block diagram of an electronic apparatus of the data storage environment of FIG. 1.

FIG. 2 shows an electronic apparatus 60 which is suitable for use as the storage processing circuitry 30 (also see FIG. 1). The electronic apparatus 60 includes a communications interface 62, memory 64, processing circuitry 66, and other circuitry 68.

The communications interface 62 is constructed and arranged to connect the electronic apparatus 60 to the communications medium 26 (also see FIG. 1) to enable communications with other devices of the data storage environment 20 (e.g., the host computers 22, etc.). Such communications may be IP-based, SAN-based, cellular-based, cable-based, fiber-optic based, wireless, cloud-based, combinations thereof, and so on. Accordingly, the communications interface 62 enables the electronic apparatus 60 to robustly and reliably communicate with other external apparatus.

The memory 64 is intended to represent both volatile storage (e.g., DRAM, SRAM, etc.) and non-volatile storage (e.g., flash memory, magnetic memory, a portion of the data storage array 32, etc.). The memory 64 stores a variety of software constructs 70 including an operating system 72, specialized control code and data 74, and other code and data 76. The operating system 72 is intended to refer control instructions such as a kernel to manage computerized resources (e.g., processor cycles, memory space, etc.), drivers (e.g., an I/O stack), and so on. The specialized control code and data 74 includes instructions and data that, when run on and handled by the processing circuitry 66, causes the processing circuitry 66 to selectively operate within a particular write mode as well as detect events and transition operation from one write mode to another write mode in response to such events. The other code and data 76 includes instructions, applications, routines, etc. to provide other features such as background services (e.g., defragmentation services, snapshots, deduplication, etc.), user-level applications, administrative tools, utilities, other computerized resources, and so on.

In some arrangements, the specialized control code and data 74 includes a set of predefined thresholds and policies/rules that direct when the electronic apparatus 60 transitions to "FILL HOLE" mode, to "STRIPE WRITE" mode, etc. Such a set of predefined thresholds may originate as a set of default values, and then receive modification over time (e.g., manual settings from a human operator, automated tuning based on applied algorithms, etc.).

The processing circuitry 66 is constructed and arranged to operate in accordance with the various software constructs 70 stored in the memory 64. As will be explained in further detail shortly, the processing circuitry 66 executes the specialized code and data 74 to form specialized circuitry that controls write mode selection. It should be understood that, in some arrangements, the specialized code and data 74 is integrated with and/or forms a portion of the operating system 72.

Such processing circuitry 66 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 70 to the electronic apparatus 60. In particular, the computer program product 90 has a non-transitory (or non-volatile) computer readable medium which stores a set of instructions which controls one or more operations of the electronic apparatus 60. Examples of suitable computer readable storage media include tangible articles of manufacture and apparatus which store instructions in a non-volatile manner such as CD-ROM, DVD, flash memory, disk memory, tape memory, and the like.

The other circuitry 68 represents other specialized hardware of the electronic apparatus 60. Such specialized hardware may include storage device interfaces (e.g., for SATA, SAS, PCIe, etc.), storage devices themselves (e.g., flash drives, magnetic disk drivers, etc.), and so on. Further details will now be provided with reference to FIGS. 3 and 4.

Figure 3:
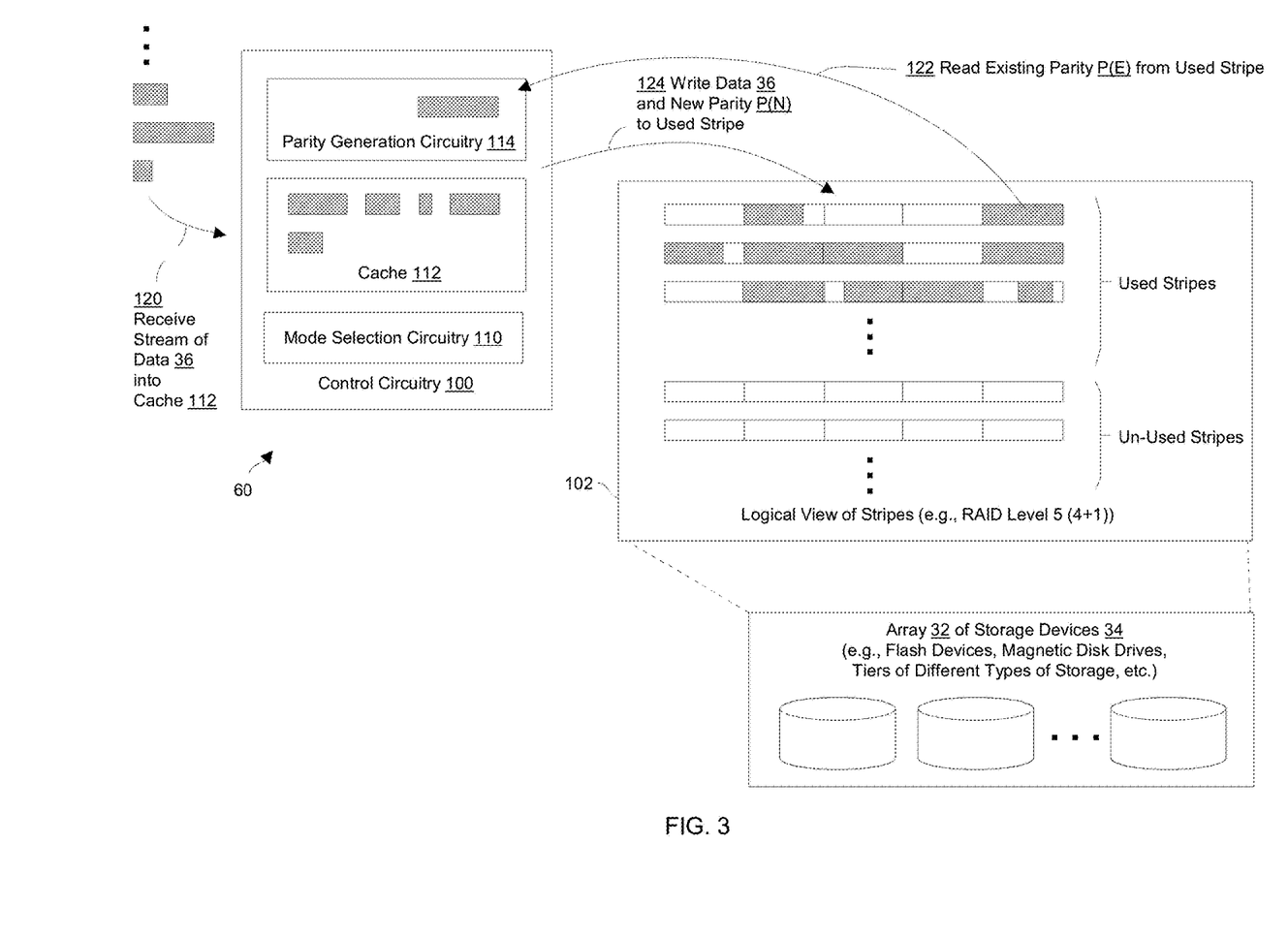
FIG. 3 is a block diagram illustrating particular details of "FILL HOLE" mode operation.
Figure 4:
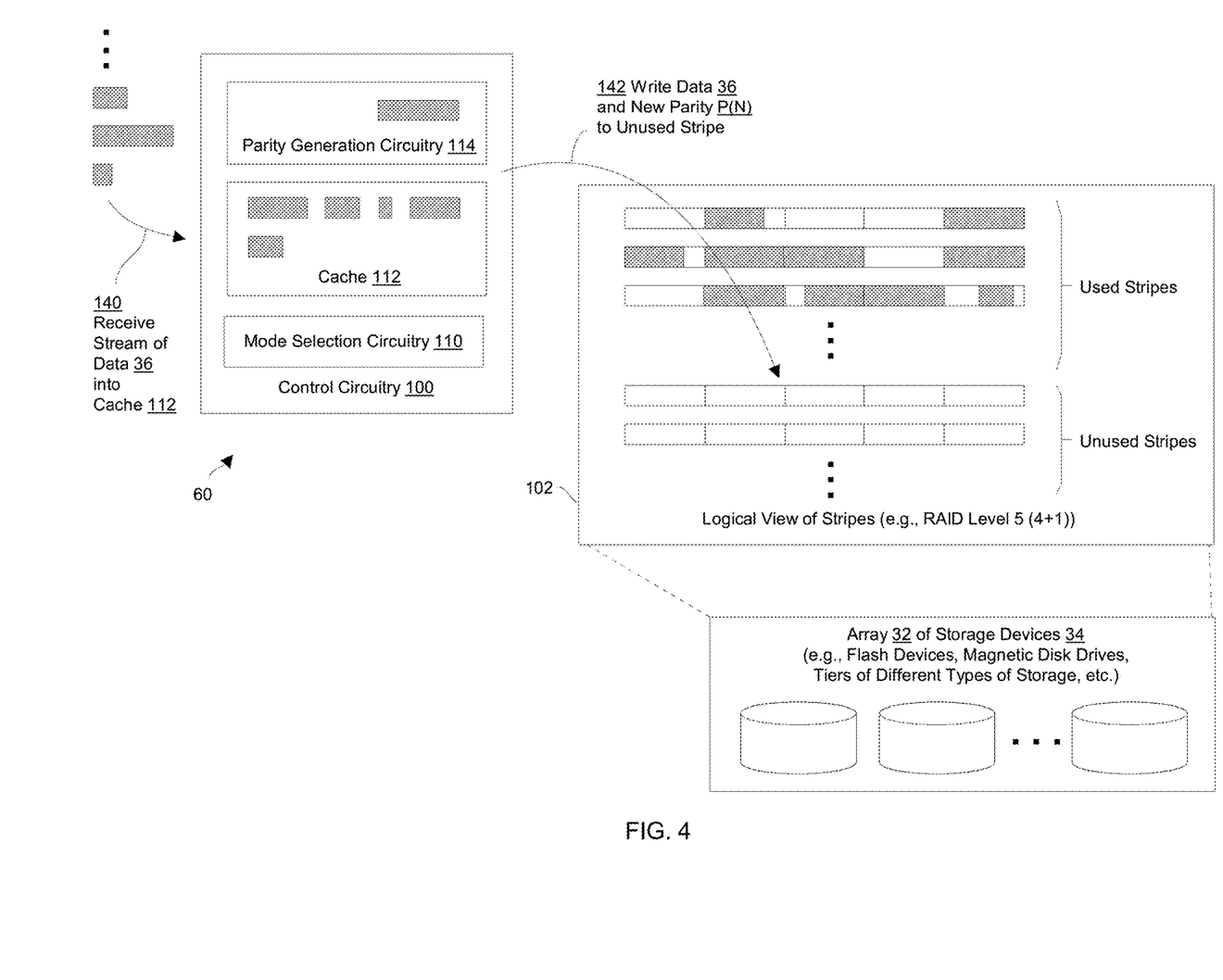
FIG. 4 is a block diagram illustrating particular details of "STRIPE WRITE" mode operation.

FIGS. 3 and 4 show particular details of different write modes for the electronic apparatus 60 (also see FIG. 2). FIG. 3 shows details of the "FILL HOLE" mode operation. FIG. 4 shows details of the "STRIPE WRITE" mode operation.

As shown in FIGS. 3 and 4, the electronic apparatus 60 includes control circuitry 100 which is formed by the processing circuitry 66 operating based on the specialized code and data 74 (also see FIG. 2). The control circuitry 100, which may be part of the storage processing circuitry 30 in FIG. 1, includes mode selection circuitry 110, a cache 112 and parity generation circuitry 114. Although the cache 112 is illustrated as part of the control circuitry 100, it should be understood that the cache 100 be part of the memory 64 (also see FIG. 2), and may be a general cache or a cache which is dedicated to buffering write data.

As further shown in FIGS. 3 and 4, the array 32 of storage devices 34 may be viewed logically (see box 102). By way of example only, the array 32 is configured for RAID Level 5 (4+1) (i.e., four data segments and one parity segment for each stripe, where the parity segment is distributed). As shown by the logical view 102, the array includes used storage stripes and unused storage stripes. The used storage stripes are shown together and the unused storage stripes are shown together in the logical view 102 although these stripes may be interleaved from an addressing perspective.

During operation, the mode selection circuitry 110 selects a particular write mode for the control circuitry 100. Such selection is based on recent write loading on the electronic apparatus 60.

As shown in FIG. 3, the electronic apparatus 60 may operate in the "FILL HOLE" mode when the write load on the electronic apparatus 60 is relatively light. In particular, as the control circuitry 100 receives a stream of data 36 to be written to the array 32, the control circuitry 100 is able to handle the write load by writing the data 36 to used stripes within the array 32. That is, the control circuitry 100 first temporarily buffers the data 36 (i.e., portions of data 36) within the cache 112 (arrow 120). If the data 36 is new, the control circuitry 100 may find an unused storage location (i.e., a hole) within a used storage stripe to hold the data 36. Alternatively, if the data 36 is an update of existing data 36, the control circuitry 100 may locate the used storage stripe that holds the existing data 36.

Next, the control circuitry 100 reads existing parity P(E) of the used stripe (arrow 122) and the parity generation circuitry 114 of the control circuitry 100 generates new parity P(N) based on the data 36 to be written and the existing parity P(E). In some arrangements, such parity generation is performed by simply reading an existing parity segment of the used stripe without reading other data segments of the used stripe.

Then, the control circuitry 100 writes the data 36 and the new parity P(N) to the used stripe (arrow 124). It should be understood that the existing parity P(E) is overwritten with the newly generated parity P(N).

One should appreciate that the above-described operation of writing the data 36 within used stripes consumes particular data storage resources. In particular, I/O operations must be performed to read the existing parity P(E) from the array 32. Such activity requires time and consumes I/O bandwidth/cycles and memory space. However, if the write loading is relatively light, the electronic apparatus 60 is nevertheless able to provide acceptable latency as well as keep up with the load (i.e., the data 36 does not get overly old in the cache 112, the cache 112 does not get too full, etc.). In fact, such operation in the "FILL HOLE" mode may continue as long as the loading on the electronic apparatus 60 does not exceed particular predefined thresholds.

Moreover, operation in the "FILL HOLE" mode results in more efficient use of memory within the array 32. In particular, there are less unused stripes consumed per unit of time or per amount of data written thus reducing demand for unused stripes and other services (e.g., a background process that defragments data to create new unused stripes), less wear (e.g., improving the lifetime of flash memory), less updating of metadata (e.g., since data relocation is minimized), and so on.

As shown in FIG. 4, the electronic apparatus 60 may operate in the "STRIPE WRITE" mode when the write load on the electronic apparatus 60 increases to a higher level. In particular, as the control circuitry 100 receives the stream of data 36 to be written to the array 32, the control circuitry 100 is able to handle the write load by writing the data 36 to unused stripes within the array 32. That is, the control circuitry 100 first temporarily buffers the stream of data 36 (i.e., portions of data 36) within the cache 112 (arrow 140).

Next, the parity generation circuit control circuitry 100 generates new parity P(N) directly from the data 36 to be written. In contrast to the "FILL HOLE" mode, the control circuitry 100 does not need to read any existing parity from the array 32 while operating in the "STRIPE WRITE" mode. Then, the control circuitry 100 writes the data 36 and the new parity P(N) to an unused stripe of the array 32 (arrow 142).

One should appreciate that, since the above-described operation of writing the data 36 within unused stripes of the array 32 does not require reading existing parity, there is less latency in completing the write operation. Accordingly, the control circuitry 100 is able to evict data 36 from the cache 112 faster. As a result, there is less aging pressure and an opportunity for lower cache consumption, i.e., the control circuitry 100 is able to operate with improved efficiency while handling a larger write load. Further details will now be provided with reference to FIG. 5.

Figure 5:
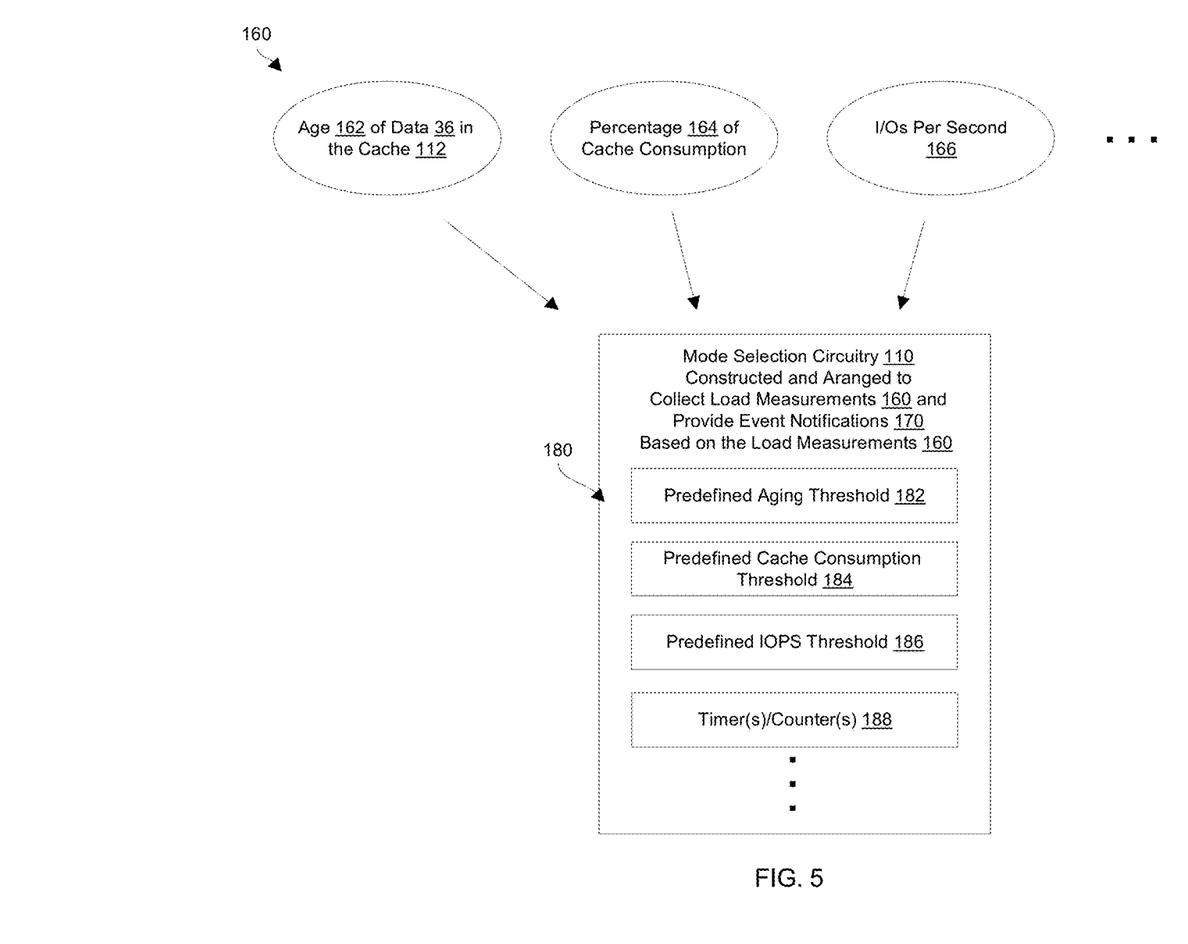
FIG. 5 is a block diagram illustrating particular details of how mode selection may be configured.

FIG. 5 shows particular details of the mode selection circuitry 110 which is constructed and arranged to select between different write modes. As mentioned earlier, the mode selection circuitry 110 selects between the "FILL HOLE" mode and the "STRIPE WRITE" mode.

In particular, the mode selection circuitry 110 receives a variety of inputs 160 and then chooses between write modes based on the inputs 160. Based on these inputs 160, the mode selection circuitry 110 provides event notifications 170 which then trigger operation in the different modes. In some arrangements, the mode selection circuitry 110 is configurable by establishing a set of policies or rules, and then applying those policies or rules, where the policies/rules may be modified, tuned, augmented, etc.

Suitable inputs 160 include load measurements such as the age 162 of the data 36 currently in the cache 112 (e.g., how long the oldest data 36 to be written to the array 32 has been in the cache 112, the average age of the data 36, etc.), the percentage 164 of the cache 112 that is currently holding data 36 (e.g., the actual percentage of cache consumption, the average cache consumption over a short period of time, etc.), and the number of I/Os per second 166. Other inputs 160 are suitable for use as well such as the number of write operations per second, and so on. In some arrangements, mode selection is based on a combination of these load measurements 160.

To determine when events occur, the mode selection circuitry 110 maintains a variety of operating parameters 180. Example operating parameters include a predefined aging threshold 182, a predefined cache consumption threshold 184, a predefined IOPS threshold 186, a set of timers/counters 188, and so on. Along these lines, the mode selection circuitry 110 may conclude that the data 36 has reached a critical age by comparing the age input 162 to the predefined age threshold 182 (e.g., if the age input 162 is higher than the predefined age threshold 182, the data 36 in the cache 112 has become too stale). Similarly, the mode selection circuitry 110 may conclude that the cache 112 has become critically full by comparing the percentage 164 of cache consumption to the predefined cache consumption threshold 184 (e.g., if the percentage 164 is higher than the predefined cache consumption threshold 184, the cache 112 has become too full). Likewise, the mode selection circuitry 110 may conclude that the I/O load on the electronic apparatus 60 has become high by comparing the IOPS 166 to the predefined IOPS threshold 186, and so on.

The mode selection circuitry 110 may continuously collect the load measurements 160 and perform comparisons with the operating parameters 180 to detect events. If the mode selection circuitry 110 identifies a particular event (e.g., the aging of data 36 within the cache 112 reaching a particular level, cache consumption reaching a particular level, the combination of aging and cache consumption reaching particular levels, etc.), the mode selection circuitry 110 outputs an event notification 170.

In turn, the event notification 170 may trigger transitioning of the control circuitry 100 (FIGS. 3 and 4) from operating in one write mode to another write mode (e.g., based on policies/rules/etc.). Moreover, the control circuitry 100 may be configured to operate within the new write mode for a predefined amount of time (e.g., 20 minutes, 30 minutes, an hour, etc.). For example, in response to a determination of a high write loading condition due to critical aging of data in the cache 112 (i.e., a first event), the control circuitry 100 may transition from the "FILL HOLE" mode to the "STRIPE WRITE" mode for the predefined amount of time. After that amount of time has elapsed (i.e., a second event) or upon detection of another situation, the control circuitry 100 may automatically transition from the "STRIPE WRITE" mode back to the "FILL HOLE" mode.

In some arrangements, the predefined amount of time may be increased (e.g., doubled, extended, etc.) in response to other factors. Such factors may include detection of another event, a combination of events, input from a scheduler, and so on. Further details will now be provided with reference to FIG. 6.

Figure 6:
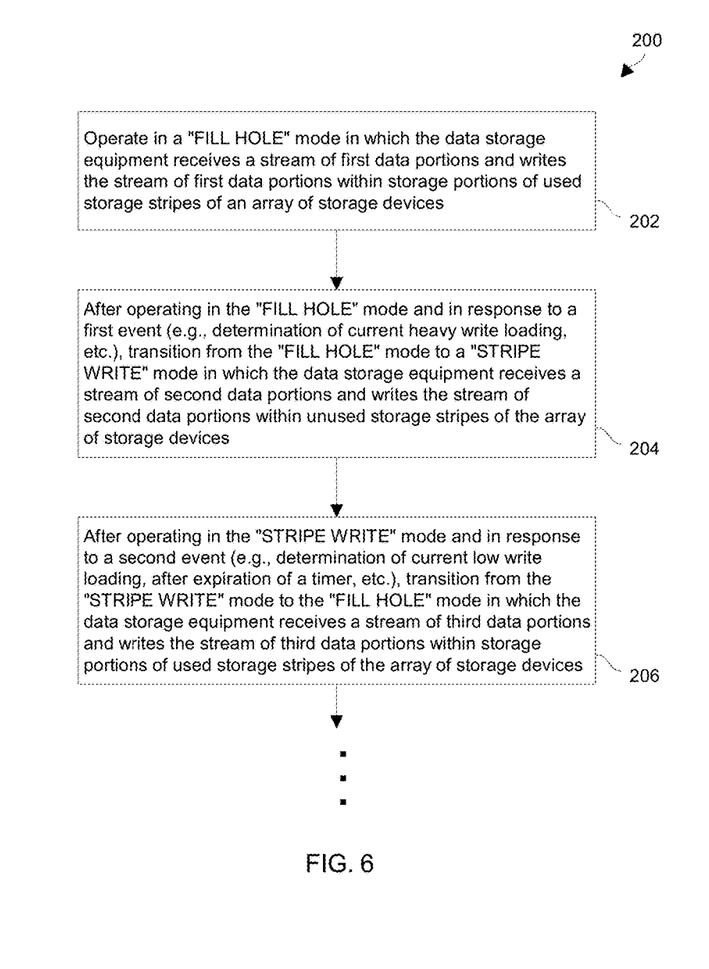
FIG. 6 is a flowchart of a procedure which is performed by the electronic apparatus of FIG. 2.

FIG. 6 is a flowchart of a procedure 200 for the data storage equipment 24 (also see FIG. 1). At 202, the data storage equipment operates in a "FILL HOLE" mode in which the data storage equipment receives a stream of first data portions and writes the stream of first data portions within storage portions of used storage stripes of the array of storage devices.

At 204, the data storage equipment, after operating in the "FILL HOLE" mode and in response to a first event, transitions from the "FILL HOLE" mode to a "STRIPE WRITE" mode. In the "STRIPE WRITE" mode, the data storage equipment receives a stream of second data portions and writes the stream of second data portions within unused storage stripes of the array of storage devices. For example, the data storage equipment may start writing data to unused stripes in response to detection of heavy write loading.

At 206, the data storage equipment, after operating the data storage equipment in the "STRIPE WRITE" mode and in response to a second event, transitions from the "STRIPE WRITE" mode back to the "FILL HOLE" mode. Here, the data storage equipment receives a stream of third data portions and writes the stream of third data portions within storage portions of used storage stripes of the array of storage devices. For example, the data storage equipment may start writing data to used stripes in response to detection of low write loading, after expiration of a timer that was started at 204, etc.

Such operation of switching between the different write modes may continue thus enabling the data storage equipment to adapt to different amounts of write loading. In particular, while in the "FILL HOLE" mode, the data storage equipment consumes fewer unused stripes per data written. Additionally, while in the "STRIPE WRITE" mode, the data storage equipment avoids situations in which cached data becomes too stale, the cache becomes overconsumed, and so on.

As described above, improved techniques are directed to selectively operating data storage equipment 24 in a "STRIPE WRITE" mode and a "FILL HOLE" mode. In the "STRIPE WRITE" mode, the data storage equipment 24 buffers data 36 into data stripes and then writes the data stripes into unused storage stripes of an array 32 of storage devices 34 thus efficiently generating parity directly from the buffered data 36 without unnecessarily creating extra input/output (I/O) operations to read parity from the array. In the "FILL HOLE" mode, the data storage system 24 writes the data 36 into used storage stripes of the array 32 thus reducing consumption of unused storage stripes and thus imposing less demand on other supporting services such as defragmentation that has to create more unused storage stripes. Selection of the particular mode may be based on loading measurements (e.g., aging of data within a cache, cache consumption, I/O operations per second, and so on).

One should appreciate that the above-described techniques do not merely carry out an abstract idea of writing data to an array. Rather, the disclosed techniques improve technology by enabling specialized data storage equipment to reduce unused stripe consumption during periods of low write loading, and operate efficiently under heavy write loading. With these techniques, other advantages are available as well such as reduced flash memory wear that extends flash memory lifetime and lower demand for unused stripes while in the "FILL HOLE" mode, reduced latency while in the "STRIPE WRITE" mode, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of writing data to an array of storage devices that is coupled to data storage equipment, the method comprising:

operating the data storage equipment in a "FILL HOLE" mode in which the data storage equipment receives a stream of first data portions and writes the stream of first data portions within storage portions of used storage stripes of the array of storage devices;

after operating the data storage equipment in the "FILL HOLE" mode and in response to a first event indicating an increase in write loading on the data storage equipment, transitioning the data storage equipment from the "FILL HOLE" mode to a "STRIPE WRITE" mode in which the data storage equipment receives a stream of second data portions and writes the stream of second data portions exclusively within completely unused storage stripes of the array of storage devices, wherein the unused storage stripes of the array of storage devices contain no data; and after operating the data storage equipment in the "STRIPE WRITE" mode and in response to a second event indicating a decrease in write loading on the data storage equipment, transitioning the data storage equipment from the "STRIPE WRITE" mode back to the "FILL HOLE" mode in which the data storage equipment receives a stream of third data portions and writes the stream of third data portions within storage portions of used storage stripes of the array of storage devices.

2. A method as in claim 1, further comprising:
after transitioning the data storage equipment from the "FILL HOLE" mode to the mode "STRIPE WRITE" mode and before transitioning the data storage equipment from the "STRIPE WRITE" mode back to the "FILL HOLE" mode, operating the data storage equipment in the "STRIPE WRITE" mode in which the stream of second data portions is written as full data stripes within unused storage stripes of the array of storage devices.

3. A method as in claim 2 wherein operating the data storage equipment in the "FILL HOLE" mode includes:
reading existing parity from a used storage stripe of the array of storage devices,
generating new parity based on a set of first data portions and the existing parity, and
writing the set of first data portions and the new parity into the used storage stripe of the array of storage devices, the existing parity being overwritten by the new parity.

4. A method as in claim 3 wherein operating the data storage equipment in the "STRIPE WRITE" mode includes:
accumulating multiple second data portions from the stream of second data portions,
generating a parity portion based on the multiple second data portions, and
writing a full data stripe into an unused storage stripe of the array of storage devices, the full data stripe including the multiple second data portions and the parity portion.

5. A method as in claim 4 wherein a second data portion of the full data stripe is a new data portion that replaces an existing data portion that is stored in a used storage stripe of the array of storage devices; and wherein the method further comprises:
updating metadata, which identifies the second data portion, to no longer address a particular storage portion of the used storage stripe and to now address a particular storage portion of the unused storage stripe that is written to with the full data stripe.

6. A method as in claim 5, further comprising:
electronically collecting load measurements, each load measurement identifying an amount of loading on the data storage equipment, and
providing event notifications based on the electronically collected load measurements, the event notifications identifying the first event and second event.

7. A method as in claim 6 wherein providing the event notifications based on the electronically collected load measurements includes:
outputting a first event notification identifying the first event, the first event notification indicating that write loading on the data storage equipment has increased from a normal level to a critical level.

8. A method as in claim 7 wherein electronically collecting the load measurements includes:
detecting that an age of a set of first data portions within a cache exceeds a predefine age threshold, the cache operating as a buffer for data en route to the array of storage devices; and
wherein outputting the first event notification includes:
providing an alert indicating that the age of the set first data portions within the cache exceeds the predefine age threshold, the data storage equipment transitioning from the "FILL HOLE" mode to the "STRIPE WRITE" mode in response to the alert.

9. A method as in claim 7 wherein electronically collecting the load measurements includes:
detecting that presence of a set of first data portions within a cache causes a cache consumption percentage of the cache to exceed a predefine cache consumption threshold, the cache operating as a buffer for data en route to the array of storage devices; and
wherein outputting the first event notification includes:
providing an alert indicating that the cache consumption percentage exceeds the predefine cache consumption threshold, the data storage equipment transitioning from the "FILL HOLE" mode to the "STRIPE WRITE" mode in response to the alert.

10. A method as in claim 7 wherein providing the event notifications based on the electronically collected load measurements further includes:
outputting a second event notification identifying the second event, the second event notification indicating that write loading on the data storage equipment has decreased from the critical level to the normal level.

11. A method as in claim 7 wherein providing the event notifications based on the electronically collected load measurements further includes:
outputting a second event notification identifying the second event, the second event notification indicating that a "STRIPE WRITE" mode timer has elapsed, and the "STRIPE WRITE" mode timer having been initially set to a predefined amount of time in response to the first event notification.

12. A method as in claim 1 wherein the data storage equipment manages multiple logical units of storage (LUNs); and wherein the method further comprises:
directing the data storage equipment to independently operate in the "FILL HOLE" mode and the "STRIPE WRITE" mode in a per LUN manner for each LUN of the multiple LUNs managed by the data storage equipment.

13. The method of claim 1, wherein each one of the unused stripes of the data storage array is created when data is removed from a stripe of the data storage array.

14. Data storage equipment, comprising:
a communications interface;
memory; and
control circuitry coupled to the communications interface and the memory, the memory storing instructions which, when carried out by the control circuitry, cause the control circuitry to:
operate the data storage equipment in a "FILL HOLE" mode in which the data storage equipment receives a stream of first data portions and writes the stream of first data portions within storage portions of used storage stripes of an array of storage devices through the communications interface,
after operating the data storage equipment in the "FILL HOLE" mode and in response to a first event indicating an increase in write loading on the data storage equipment, transition the data storage equipment from the "FILL HOLE" mode to a "STRIPE WRITE" mode in which the data storage equipment receives a stream of second data portions and writes the stream of second data portions exclusively within completely unused storage stripes of the array of storage devices through the communications interface, wherein the unused storage stripes of the array of storage devices contain no data, and after operating the data storage equipment in the "STRIPE WRITE" mode and in response to a second event indicating a decrease in write loading on the data storage equipment, transition the data storage equipment from the "STRIPE WRITE" mode back to the "FILL HOLE" mode in which the data storage equipment receives a stream of third data portions and writes the stream of third data portions within storage portions of used storage stripes of the array of storage devices through the communications interface.

15. Data storage equipment as in claim 14 wherein the control circuitry is further constructed and arranged to:

after transitioning the data storage equipment from the "FILL HOLE" mode to the mode "STRIPE WRITE" mode and before transitioning the data storage equipment from the "STRIPE WRITE" mode back to the "FILL HOLE" mode, operate the data storage equipment in the "STRIPE WRITE" mode in which the stream of second data portions is written as full data stripes within unused storage stripes of the array of storage devices.

16. Data storage equipment as in claim 15 wherein operating the data storage equipment in the "FILL HOLE" mode includes:

reading existing parity from a used storage stripe of the array of storage devices, generating new parity based on a set of first data portions and the existing parity, and writing the set of first data portions and the new parity into the used storage stripe of the array of storage devices, the existing parity being overwritten by the new parity.

17. Data storage equipment as in claim 16 wherein operating the data storage equipment in the "STRIPE WRITE" mode includes:

accumulating multiple second data portions from the stream of second data portions, generating a parity portion based on the multiple second data portions, and writing a full data stripe into an unused storage stripe of the array of storage devices, the full data stripe including the multiple second data portions and the parity portion.

18. Data storage equipment as in claim 17 wherein a second data portion of the full data stripe is a new data portion that replaces an existing data portion that is stored in a used storage stripe of the array of storage devices; and wherein the control circuitry is further constructed and arranged to:

update metadata, which identifies the second data portion, to no longer address a particular storage portion of the used storage stripe and to now address a particular storage portion of the unused storage stripe that is written to with the full data stripe.

19. Data storage equipment as in claim 18 wherein the control circuitry is further constructed and arranged to:

electronically collect load measurements, each load measurement identifying an amount of loading on the data storage equipment, and provide event notifications based on the electronically collected load measurements, the event notifications identifying the first event and second event.

20. Data storage equipment as in claim 19 wherein the control circuitry, when providing the event notifications based on the electronically collected load measurements, is constructed and arranged to:

output a first event notification identifying the first event, the first event notification indicating that write loading on the data storage equipment has increased from a normal level to a critical level, and output a second event notification identifying the second event, the second event notification indicating that write loading on the data storage equipment has decreased from the critical level to the normal level.

21. A computer program product having a non-transitory computer readable medium that stores a set of instructions to write data to an array of storage devices; the set of instructions, when carried out by data storage equipment, causing the data storage equipment to perform a method of:

operating the data storage equipment in a "FILL HOLE" mode in which the data storage equipment receives a stream of first data portions and writes the stream of first data portions within storage portions of used storage stripes of the array of storage devices;

after operating the data storage equipment in the "FILL HOLE" mode and in response to a first event indicating an increase in write loading on the data storage equipment, transitioning the data storage equipment from the "FILL HOLE" mode to a "STRIPE WRITE" mode in which the data storage equipment receives a stream of second data portions and writes the stream of second data portions exclusively within completely unused storage stripes of the array of storage devices, wherein the unused storage stripes of the array of storage devices contain no data; and after operating the data storage equipment in the "STRIPE WRITE" mode and in response to a second event indicating a decrease in write loading on the data storage equipment, transitioning the data storage equipment from the "STRIPE WRITE" mode back to the "FILL HOLE" mode in which the data storage equipment receives a stream of third data portions and writes the stream of third data portions within storage portions of used storage stripes of the array of storage devices.

22. The method of claim 13, wherein each one of the unused storage stripes of the array of storage devices is created by a defragmentation service that executes within the data storage equipment.

\* \* \* \* \*